United States Patent
Nakano et al.

(10) Patent No.: US 9,581,992 B2
(45) Date of Patent: Feb. 28, 2017

(54) METHOD AND APPARATUS FOR A CUTTING PROCESS AUTOMATIC GENERATION TOOL OF CAM

(71) Applicant: HITACHI, LTD., Tokyo (JP)

(72) Inventors: Takahiro Nakano, Tokyo (JP); Hiroshi Arai, Tokyo (JP); Reiko Inoue, Tokyo (JP); Daisuke Tsutsumi, Tokyo (JP); Daisuke Igarashi, Tokyo (JP); Masakazu Okubo, Tokyo (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 464 days.

(21) Appl. No.: 14/133,156

(22) Filed: Dec. 18, 2013

(65) Prior Publication Data
US 2014/0180465 A1 Jun. 26, 2014

(30) Foreign Application Priority Data

Dec. 25, 2012 (JP) ................................ 2012-280828

(51) Int. Cl.
G05B 19/4097 (2006.01)
(52) U.S. Cl.
CPC ................................ *G05B 19/4097* (2013.01)
(58) Field of Classification Search
CPC .................................................. G05B 19/4097
See application file for complete search history.

(56) References Cited

U.S. PATENT DOCUMENTS 6,720,963 B2 * 4/2004 Yoshida .................. G06T 17/30
345/420

FOREIGN PATENT DOCUMENTS

| JP | 06-149334 A | 5/1994 |
| JP | 08-263124 A | 10/1996 |
| JP | 2002-304203 A | 10/2002 |
| JP | 2003-231041 A | 8/2003 |
| WO | 2013/046350 A1 | 4/2013 |

OTHER PUBLICATIONS

Okuda et al., "Development of Computer-aided Flexible Process Planning System", The 6th Proceedings of Manufacturing & Machine Tool Division, The Japan Society of Mechanical Engineering, pp. 43-44, Nov. 24-25, 2006.

(Continued)

*Primary Examiner* — Ryan Jarrett
(74) *Attorney, Agent, or Firm* — Mattingly & Malur, PC

(57) ABSTRACT

In a conventional CAM apparatus, cutting regions and a tool axis angle by which the cutting time is minimized cannot be automatically set for a finish shape having a free formed surface shape. Accordingly, the CAM apparatus generates quadrangle-shaped patterns of cutting regions using coordinate data of a finish shape and an initial shape. Triangle-shaped cutting regions are generated for concave-convex faces of the finish shape. For cutting regions generated by subtraction by boolean operation with a subtract shape calculated by subtraction by boolean operation between the initial shape and the finish shape, the tool axis angle is set so that the tool does not interfere and the face is maximized. For other regions, the tool axis is set so as to satisfy a remainder standard and to minimize a tool path length.

6 Claims, 15 Drawing Sheets

(56) References Cited

OTHER PUBLICATIONS

Kasahara et al., "Study on Supporting System for Process Planning Using an Algorithm of Shortest Path Problem (1st Report)—Analysis of Machining Sequence for Shortest Machining Time", Journal of the Japan Society for Precision Engineering, pp. 1188-1193, vol. 76, No. 10, Oct. 2010.

* cited by examiner

| MACHINING CONDITION NUMBER | NUMBER OF TOOL | SPINDLE SPEED (rpm) | FEED RATE (mm/min) | FEED PER TOOTH (mm/t) | CUTTING SPEED (m/min) | AXIAL DEPTH OF CUT (mm) | RADIAL DEPTH (mm) |
|---|---|---|---|---|---|---|---|
| 1 | 1 | 700 | 1600 | 0.5 | 100 | 1 | 1 |
| 2 | 1 | 1280 | 3800 | 0.6 | 200 | 0.5 | 0.5 |
| ⋮ | ⋮ | ⋮ | ⋮ | ⋮ | ⋮ | ⋮ | ⋮ |

| NUMBER OF TOOL | TOOL DIAMETER (mm) | BASE RADIUS (mm) | TOOL LENGTH (mm) | HOLDER DIAMETER (mm) | HOLDER LENGTH (mm) |
|---|---|---|---|---|---|
| 1 | 30 | 3 | 100 | 30 | 100 |
| 2 | 40 | 6 | 100 | 50 | 200 |
| ⋮ | ⋮ | ⋮ | ⋮ | ⋮ | ⋮ |

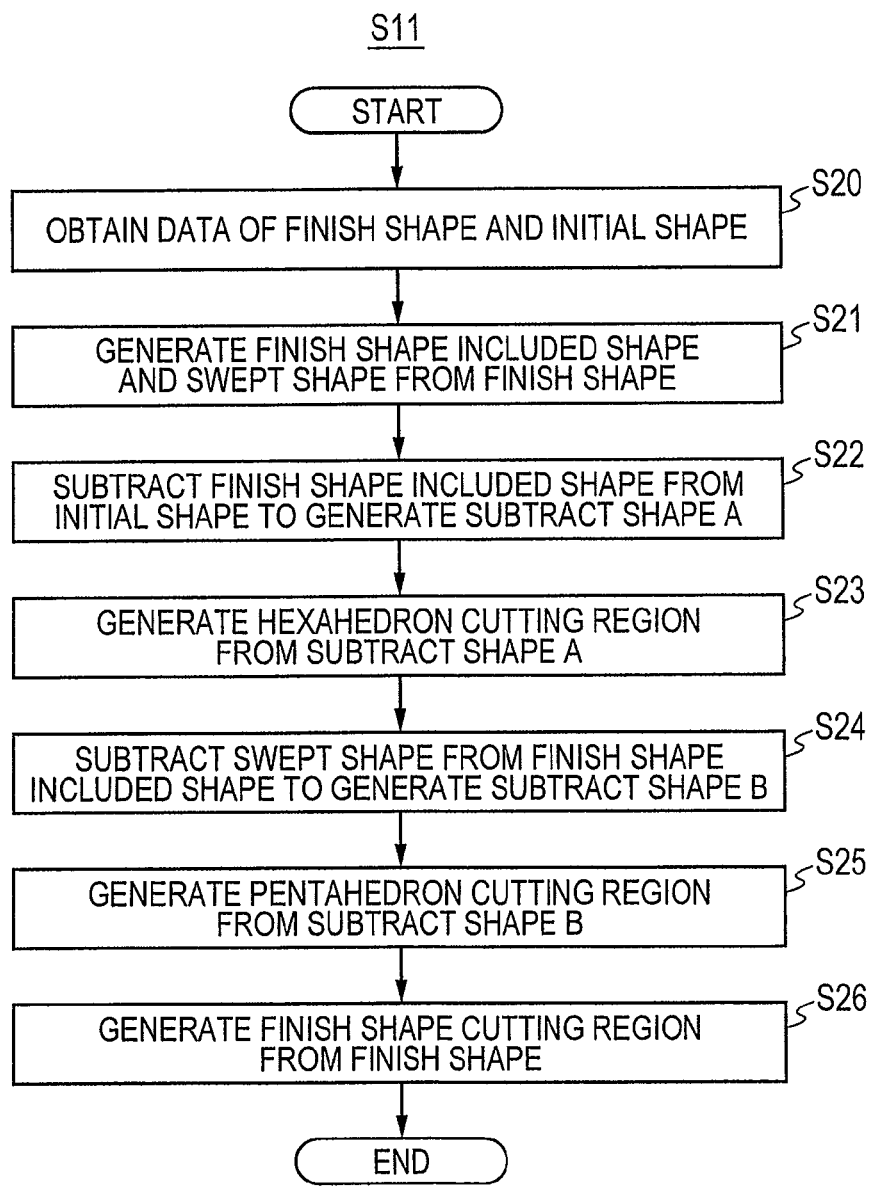

S21

(1) INITIAL WORKPIECE (2) FINISH SHAPE INCLUDED SHAPE (3) FINISH SHAPE SWEPT SHAPE (4) SWEPT SHAPE

FINISH SHAPE

MAXIMUM/MINIMUM

SWEEP IN X DIRECTION

CONJUNCTION

CONVEX

FIG. 14
S26
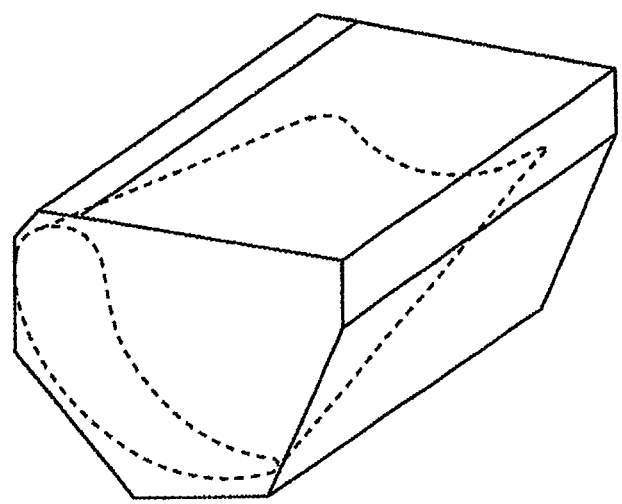
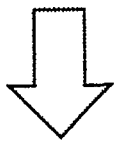
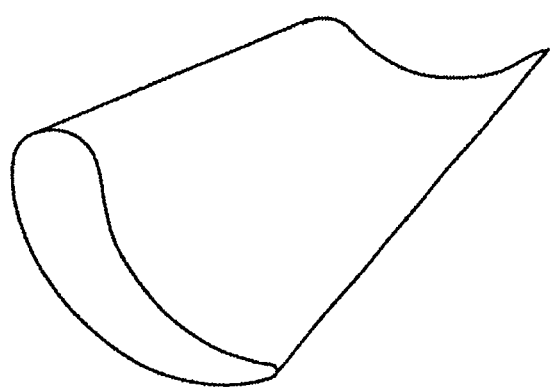

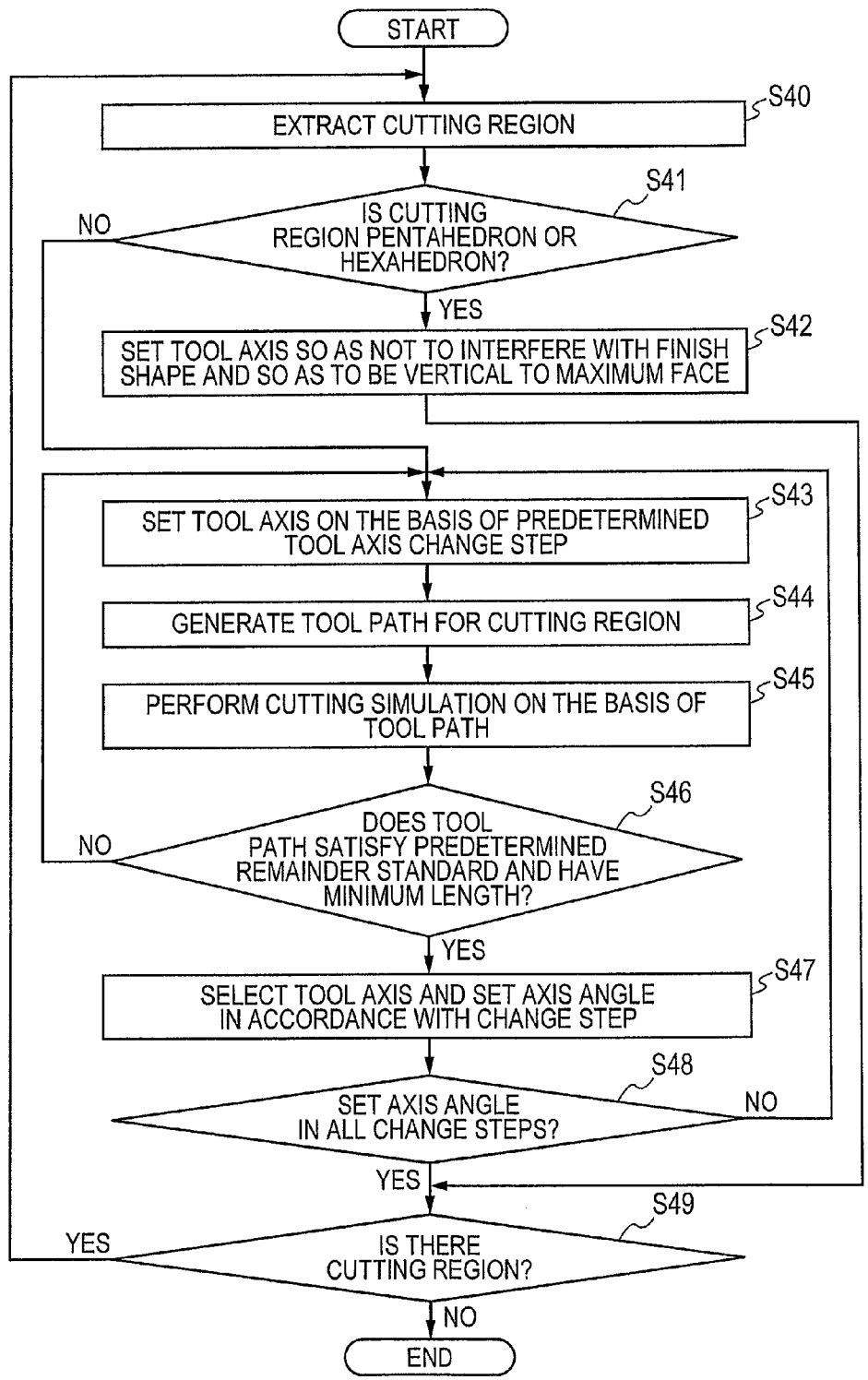

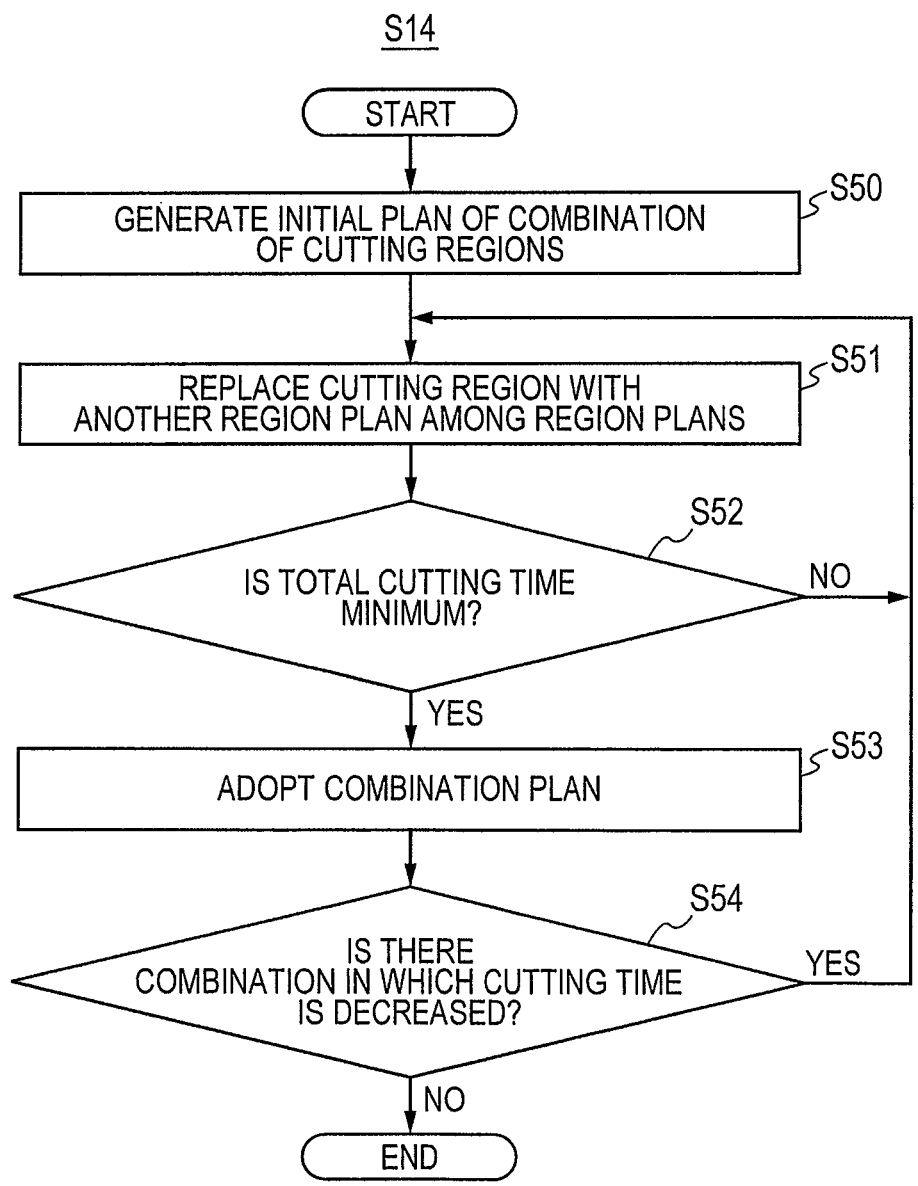

METHOD AND APPARATUS FOR A CUTTING PROCESS AUTOMATIC GENERATION TOOL OF CAM

The present invention belongs to a technical field of a CAM (Computer Aided Manufacturing) apparatus that creates NC data to control an NC (Numerical Control) cutting machine, and particularly to a technical field of automatically determining a combination of cutting regions and the angle of a tool axis for the cutting regions.

BACKGROUND OF THE INVENTION

Japanese Patent Application Laid-Open No. H08-263124 is one of prior arts of the present invention.

In Japanese Patent Application Laid-Open No. H08-263124, face attribute giving means that generates a part model from an initial workpiece model using CAD using solid modeling and gives the attribute of a cutting target face to each face of the part model and the attribute of a face direction relative to a tool, and coordinate operator means that calculates so as to change the coordinate system of the whole part model from the attribute of the face direction are provided, so that defining cutting conditions for the face and generating a cutting program to cut the face are realized.

Further, Japanese Patent Application Laid-Open No. H08-263124 describes a technique in which using the CAD using solid modeling, plural face coordinates of machining center of multiface machining can be easily set and amended, so that recreating an accurate real model on a computer can be realized, and confirmation work of a user can be significantly improved.

Further, Japanese Patent Application Laid-Open No. 2003-231041 describes that the total cutting time is reduced by repeating a process in which plural tool paths used by one kind of tool are created for a cutting shape by the N-th contour line when rough cutting of a die is performed by contouring, one of the tool paths with the minimum cutting time is selected, and the N-th optimized tool path is determined.

Further, Japanese Patent Application Laid-Open No. 2002-304203 describes a technique in which on the basis of cutting shape data, tool data, initial workpiece data, and machine control data, a calculation angle case of a rotary feed axis with which an initial workpiece and a tool do not interfere is created, and cutting cost of the calculation angle case is evaluated, so that the optimum calculation angle is operated. In addition, the work is cut by table feed axis control of maximum simultaneously controlled 3 axes on the basis of the calculation angle.

SUMMARY OF INVENTION

However, the method described in Patent Document 1 is a method in which the cutting regions are limited to planes of the part model and the process is repeated until no cutting regions exist, and the cutting time for the cutting regions is not mentioned. Further, the method described in Patent Document 1 is a method in which the cutting regions are limited to the planes by the tool axis angle, and the tool axis angle is set so as to cut with a base or a side of the tool on the basis of the plane normal. Thus, the method cannot be applied to a case in which the cutting regions are of free formed surfaces.

Further, the method described in Patent Document 2 is a method in which plural tool paths used by one kind of tool are created for a cutting shape by the N-th contour line in the contouring method, and one of the tool paths with the minimum cutting time is specified. The total cutting time becomes minimum because the N-th cutting time specifies the shortest tool path. However, the cutting regions cut by the contouring are limited to the planes, and thus the method cannot be applied to a case in which bases and sides of the cutting regions are of free formed surfaces.

Further, in Japanese Patent Application Laid-Open No. 2002-304203, the tool axis angle is set on the basis of the calculation angle case of the finish shape to create the tool path, and the cost of the tool path is evaluated. Thus, the method cannot be adapted to simultaneously controlled 5 feed axes control of tables (coordinate values x, y, and z) and rotary tables (rotational angles A and B).

Further, in Japanese Patent Application Laid-Open No. H08-263124 and No. 2002-304203, the cutting regions are cutting target faces of the part model. In Patent Document 2, the cutting regions are cut planes of a subtract shape created based on an initial shape model and a die model. Thus, evaluating the cost of the cutting regions and obtaining a combination of cutting regions with the best cost performance among plural cutting regions are not mentioned.

BRIEF DESCRIPTION OF THE INVENTION

Accordingly, an object of the present invention is to provide a CAM apparatus that automatically generates, at least, one cutting region for a finish shape having a free formed surface shape, and automatically sets a combination of cutting regions and a tool axis angle by which the total cutting time is shortened.

As means for solving the above-described problems, in the case where NC data is created on the basis of a finish shape CAD (Computer Aided Design) model that is stored in a storing device and has face data with which, at least, two faces can be identified, an initial workpiece CAD model, machining condition data, and tool condition data, and in the case where cutting regions are created, the present invention includes a function (cutting region calculating unit) that creates a finish shape included shape form a finish shape and a swept shape determined by swept determined by a clamp of a cutting machine form the finish shape; creates a subtract shape A by performing subtraction by boolean operation for the finish shape included shape from an initial shape; divides the subtract shape A into hexahedron cutting regions including, at least, one partial overlap with a subtract part; creates a subtract shape B by performing subtraction by boolean operation for the swept shape from the finish shape included shape; divides the subtract shape B into pentahedron (polyhedron composed of counter-face surfaces of two triangles and three side faces) cutting regions including, at least, one partial overlap with a subtract part; creates a finish shape cutting region configured using, at least, one face from faces configuring the finish shape; and creates cutting regions of the hexahedron cutting regions, the pentahedron cutting regions, and the finish shape cutting regions.

Further, the present invention includes a function (tool axis angle calculating unit) that sets a tool axis angle for the generated hexahedron cutting regions and pentahedron cutting regions so that the tool does not interfere with the current cutting shape and the cutting machine and becomes vertical to the face of area maximum of the hexahedron cutting regions and the pentahedron cutting regions, and that sets a tool axis angle for the finish shape cutting regions so as to satisfy a remainder standard requested by a CAM operator and so as to make a tool path (swept of the tool control point) length shortest on the basis of the tool and the machining condition.

Further, the present invention includes a function (cutting time calculating unit) that allocates the tool and the machining condition for the hexahedron cutting regions, the pentahedron cutting regions, and the finish shape cutting regions to generate a tool path, and calculates a cutting time on the basis of the machining conditions of the generated tool path length and tool feed rate.

Further, the present invention includes a function (cutting region combination searching unit) that calculates a combination of cutting regions with the shortest cutting time among combinations of the hexahedron cutting regions, the pentahedron cutting regions, and the finish shape cutting regions.

Advantageous Effects of Invention

According to the present invention, patterns of the cutting regions by which tool path generation for face cutting in the hexahedron cutting regions and the pentahedron cutting regions is realized can be listed, and the cutting regions in which cutting with high efficiency of the subtract volume per unit area can be realized by the tool path for face cutting can be generated.

Further, the cutting regions for the free formed surface shape can be generated in the finish shape cutting region generated by the present invention.

Further, according to the present invention, the tool axis angle is set so as to be vertical to the largest face of the cutting regions. Thus, a distance in the tool axis direction can be minimized, and not cutting path such as air-cut can be minimized.

Further, according to the present invention, a combination of cutting regions with the shortest total cutting time can be calculated. Accordingly, cutting regions are automatically generated for a finish shape having a free formed surface shape, and a combination of cutting regions and a tool axis angle by which the total cutting time is shortened can be automatically set.

BRIEF DESCRIPTION OF THE DRAWINGS

FIG. 2 is a diagram for showing machining condition data;

FIG. 3 is a diagram for showing tool data;

FIG. 9 is a flowchart for showing a flow of a cutting machine used in an embodiment of the present invention and generation of machining process;

FIG. 14 is an explanatory view for explaining a relation between a swept shape and a finish shape;

FIG. 15 is a flowchart for showing an angle creation flow by a tool axis angle calculating unit; and FIG. 16 is a flowchart for showing a search flow by a cutting region combination searching unit.

MODE FOR CARRYING OUT THE INVENTION

Hereinafter, an embodiment of the present invention will be described using the drawings.

Figure 1:
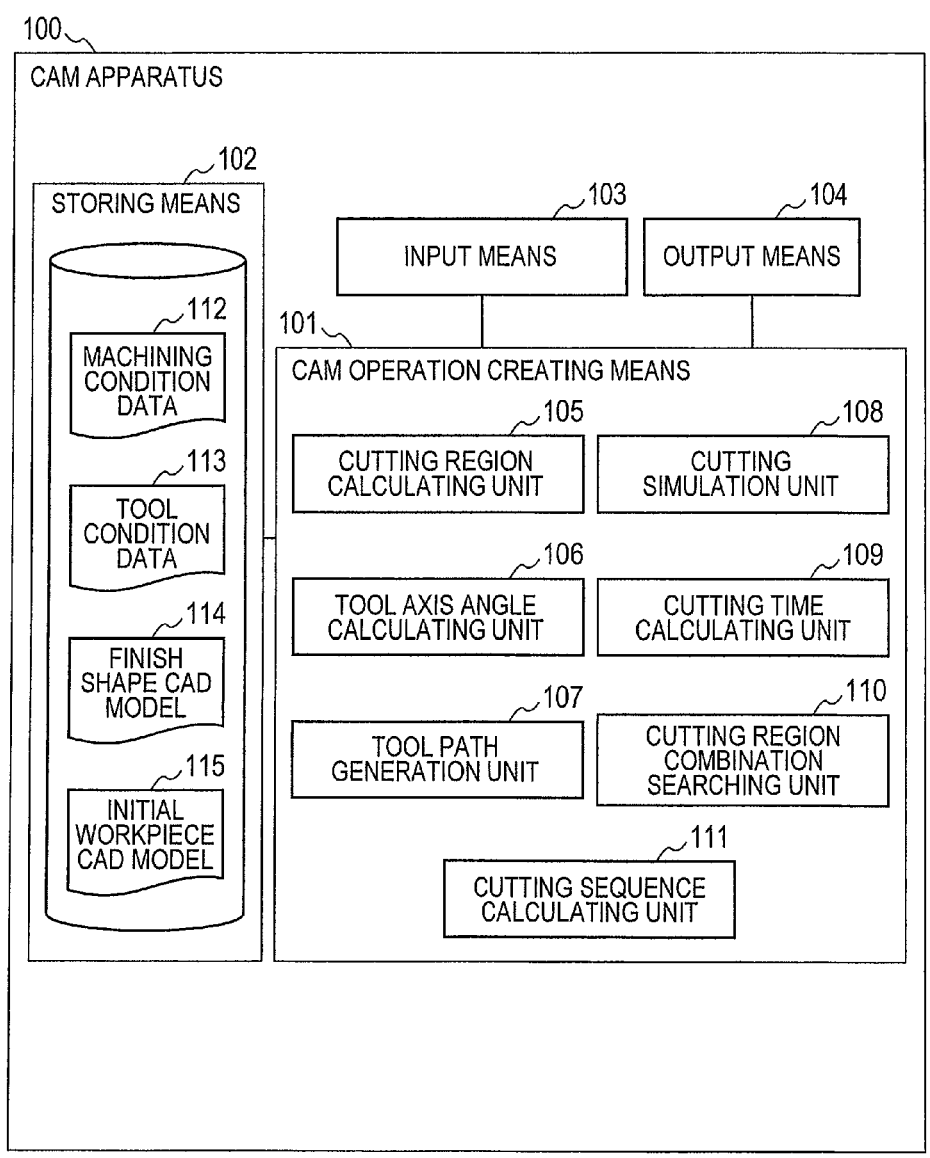
FIG. 1 is a diagram for showing an outline view of a CAM apparatus.

FIG. 1 is an outline view for showing configurations of various pieces of data and respective processing units of a CAM apparatus 100. As shown in the drawing, the CAM apparatus 100 includes CAM operation creating means 101, storing means 102, input means 103, and output means 104. The CAM operation creating means 101 has a cutting region calculating unit 105, a tool axis angle calculating unit 106, a tool path generation unit 107, a cutting simulation unit 108, a cutting time calculating unit 109, a cutting region combination searching unit 110, and a cutting sequence calculating unit ill. The storing means 102 has machining condition data 112, tool condition data 113, a finish shape CAD model 114, and an initial workpiece CAD model 115.

It should be noted that the embodiment of the present invention is realized by customizing a commercially-available CAM apparatus, and the cutting region calculating unit 105, the tool axis angle calculating unit 106, the cutting time calculating unit 109, the cutting region combination searching unit 110, and the cutting sequence calculating unit 111 of the CAM operation creating means 101 are added for the present invention. Thus, these units will be described in detail using flowcharts and explanatory views.

The storing means 102, the input means 103, the output means 104, the tool path generation unit 107, the cutting simulation unit 108, and the storing means 102 use functions of the commercially-available CAM apparatus. Further, the machining condition data 112, the tool condition data 113, the finish shape CAD model 114, and the initial workpiece CAD model 115 stored in the storing means 102 are data created by using functions of the commercially-available CAM apparatus. Further, the finish shape CAD model 114 and the initial workpiece CAD model 115 may be created by using a commercially-available CAD apparatus or CAM apparatus.

The machining condition data 112 stores machining condition data specifying the moving speeds, spindle speeds, and types of tools. The machining condition data stores a machining condition table 112 as showing in, for example FIG. 2. As shown in the drawing, the machining condition table 112 has a machining condition number section 112$b$, a number-of-tool section 112$c$, a spindle speed section 112$d$, a feed rate section 112$e$, a feed-per-tooth section 112$f$, a cutting speed section 112$g$, an axial-depth-of-cut section 112$h$, and a radial depth section 112$i$.

The machining condition number section 112$b$ has numbers that identify machining conditions and are serially and independently given. Designating the machining condition number can extract machining conditions composed of a tool and values of the spindle speed, the feed rate, the feed per tooth, the cutting speed, the axial depth of cut, and the radial depth of the tool.

The number-of-tool section 112c uses the numbers of tools, each of which identifies the tool to be used and which are set using tool data to be described later.

The spindle speed section 112d stores data specifying the spindle speed specified in the number-of-tool section 112c under the conditions specified in the machining condition number section 112b. The feed rate section 112e stores data specifying the tool feed rate under the conditions specified in the machining condition number section 112b. The feed-per-tooth section 112f stores data of the feed per tooth of the tool under the conditions specified in the machining condition number section 112b. The cutting speed section 112g stores data specifying the cutting speed of the tool under the conditions specified in the machining condition number section 112b. The axial-depth-of-cut section 112h stores data specifying the cut depth of the tool in the axial direction under the conditions specified in the machining condition number section 112b. The radial depth section 112i stores data specifying the radial depth under the conditions specified in the machining condition number section 112b.

Referring back to FIG. 1, the tool condition table 113 of the storing means 102 will be described.

The tool condition data 113 stores tool shape data such as tool shapes and attachment methods. For example, the tool condition table 113 as shown in FIG. 3 is stored. As shown in the drawing, the tool condition table 113 has a number-of-tool section 113b, a tool diameter section 113c, a base radius section 113d, a tool length section 113e, a holder diameter section 113f, and a holder length section 113g.

The number-of-tool section 113b has numbers that identify tools and are serially and independently given. The numbers of tools are numbers described in the number-of-tool section 112c in the machining condition table 112a of FIG. 2.

The tool diameter section 113c stores data specifying the diameter of the tool under the conditions specified in the number-of-tool section 113b. The base radius section 113d stores data specifying the base radius of the tool under the conditions specified in the number-of-tool section 113b. The tool length section 113e stores data specifying the length of the tool under the conditions specified in the number-of-tool section 113b. The holder diameter section 113f stores data specifying the diameter of the holder under the conditions specified in the number-of-tool section 113b. The holder length section 113g stores data specifying the length of the holder under the conditions specified in the number-of-tool section 113b.

Referring back to FIG. 1, the finish shape CAD model 114 of the storing means 102 shown in FIG. 1 will be described using FIG. 4.

Figure 4A:
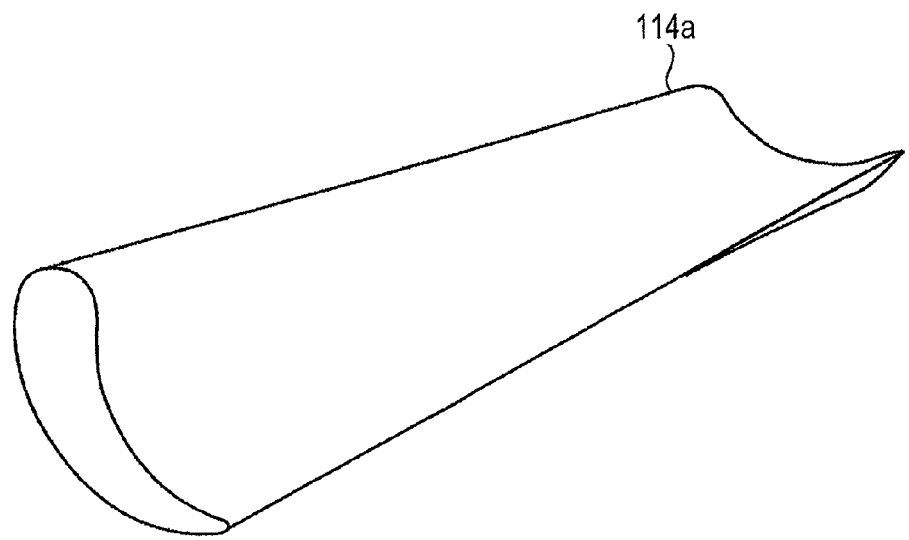
FIGS. 4A and 4B are diagrams each showing finish shape data.

The finish shape CAD model 114 stores a cutting shape for each finish shape as shown in the finish shape CAD model of FIG. 4A. For example, the shape data of a finish shape CAD model 114a shown in FIG. 4A is stored.

Figure 4B:
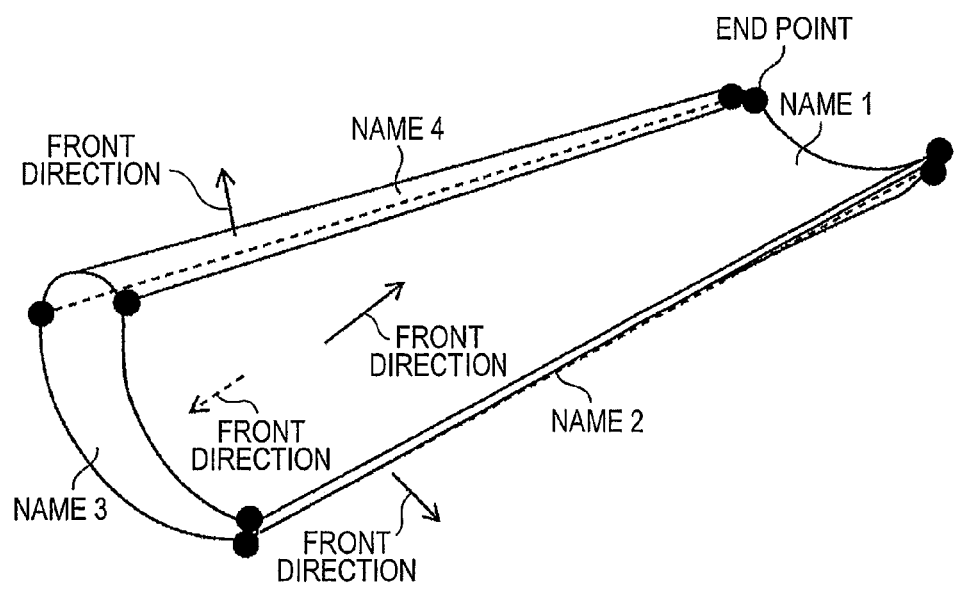

The CAD model 114a is described in a format in which four pieces of free formed surface data are arranged as shown in the face configuration of FIG. 4B. Attributes are added to four free formed surfaces so that the surfaces can be identified by names. One free formed surface is described using B-spline surface control point data and boundary curve data. Further, each face has a normal direction flag and point data of four end points around the face. The dotted arrow means that a front direction is on the back side of the drawing. Further, the respective faces are given names (names 1 to 4) as necessary.

Figure 5A:
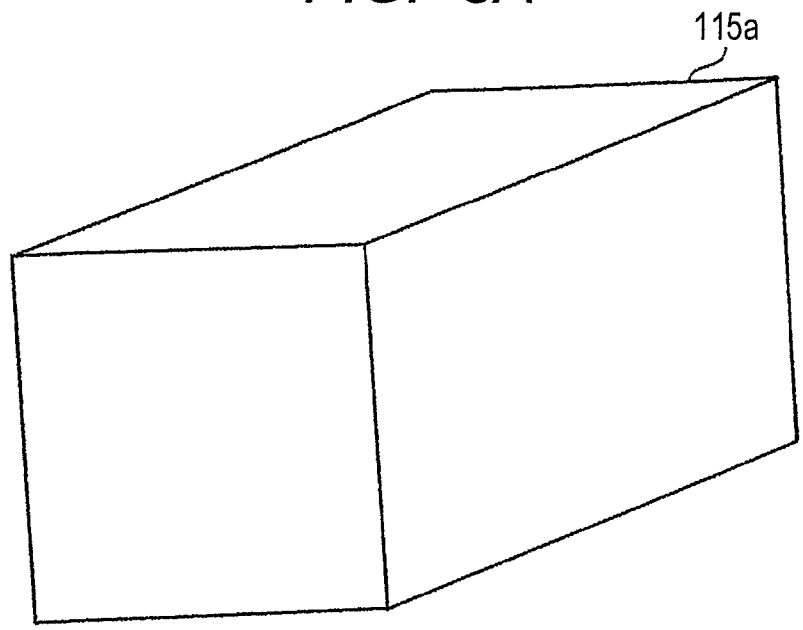
FIGS. 5A and 5B are diagrams each showing initial shape data.

Referring back to FIG. 1, the initial workpiece CAD model 115 of the storing means 102 will be described using FIG. 5. The initial workpiece CAD model 115 stores an initial shape for each finish shape as shown in the initial workpiece CAD model of FIG. 5A. For example, an initial workpiece CAD model 115a shown in FIG. 5A is stored.

Figure 5B:
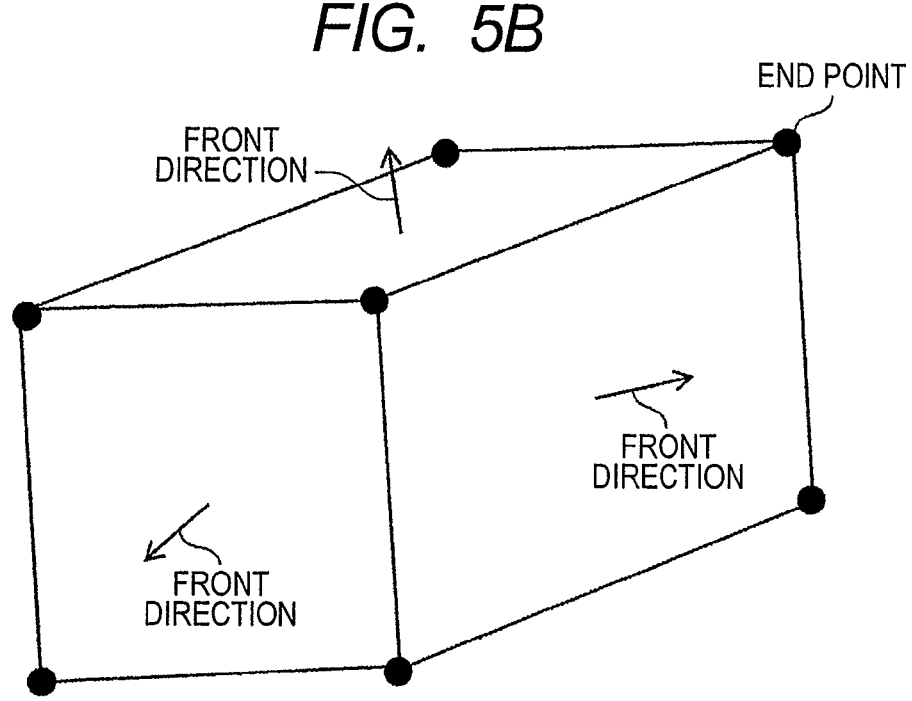

The initial workpiece CAD model 115a is described using cuboid solid data as shown in FIG. 5B. The data is described using the length, the breadth, the height, the original point of the cuboid and coordinate system data of the cuboid, and eight end points and data of six planes as shown in the face configuration of FIG. 5B. In addition, the plane data has data related to the normal direction flag.

It should be noted that other than FIG. 4A to FIG. 5B, various pieces of data such as data describing curved lines of each face, serial identification numbers, attribute data that can be arbitrarily given, and data to efficiently perform internal processes are stored in commercially-available CAD and CAM software.

Figure 6:
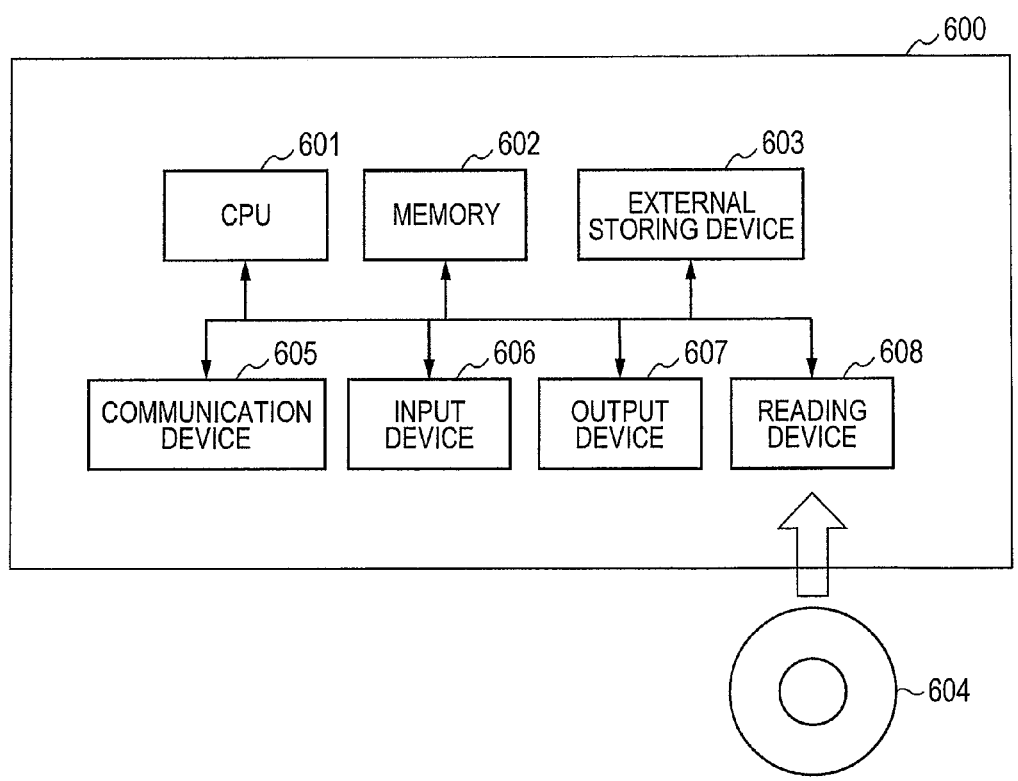
FIG. 6 is a diagram for showing a hardware configuration.

The above-described CAM apparatus 100 can be realized using a general computer 600 shown in, for example, an outline view of FIG. 6 that includes a CPU (Central Processing Unit) 601, a memory 602, an external storing device 603 such as an HDD (Hard Disk Drive), a reading device 608 that reads and writes data from/into a portable storing medium 604 such as a CD (Compact Disk) or a DVD (Digital Versatile Disk), an input device 606 such as a keyboard and a mouse, an output device 607 such as a display, and a communication device 605 such as an NIC (Network Interface Card) to be connected to a communication network. Further, programs associated with the respective processing units shown in FIG. 1 are stored in a computer-readable storing medium, and the programs are read into the memory, so that a method for a cutting process automatic generation tool of CAM of the present invention can be executed.

(Explanation of Process)

Figure 7:
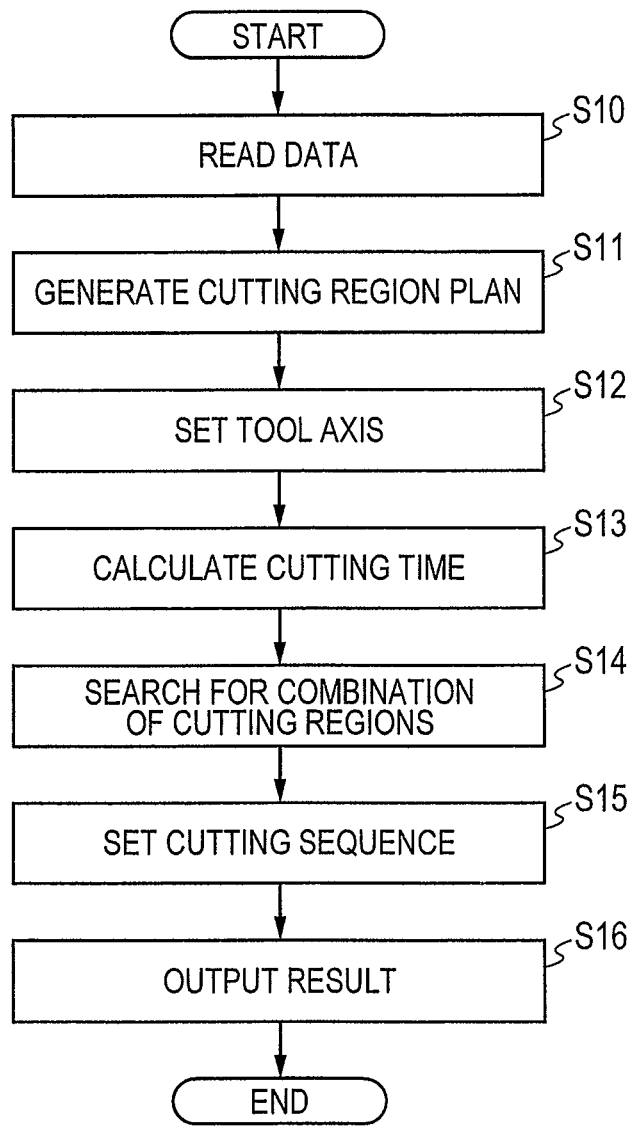
FIG. 7 is a flowchart for showing a creating flow of a CAM operation.

FIG. 7 is a flowchart for showing a generation procedure of a CAM operation using the CAM apparatus 100 shown in FIG. 1. Hereinafter, a process of the CAM operation will be described with reference to FIG. 1 to FIG. 7.

First, using functions provided in a commercially-available CAM apparatus as the basis of the CAM apparatus 100, the finish shape CAD model 114, the initial workpiece CAD model 115, the machining condition data 112, and the tool condition data 113 are created to be stored into the storing device 102. It should be noted that as the finish shape CAD model 114 and the initial workpiece CAD model 115, data created using a commercially-available CAD apparatus may be read by the CAM apparatus, or the finish shape CAD model 114 and the initial workpiece CAD model 115 may be created using functions provided in a commercially-available CAM apparatus.

Next, a data reading command is input from the input means 103, and the machining condition data 112, the tool condition data 113, the finish shape CAD model 114, and the initial workpiece CAD model 115 are extracted from the storing means 102 (S10).

Next, a cutting region plan is generated by the cutting region calculating unit 105 (S11). It should be noted that the detail of Step S11 will be described later using FIG. 9.

Next, a tool axis for the cutting region is set by the tool axis angle calculating unit 106 on the basis of the generated cutting region plan (S12). It should be noted that the detail of Step S12 will be described later using FIG. 15.

Next, a tool path for the cutting region is generated by the tool path generation unit 107, and a cutting time is calculated on the basis of the tool path length and the tool feed rate by the cutting time calculating unit 109 (S13).

Next, a combination of cutting regions with the shortest total cutting time is calculated using the generated cutting region and cutting time by the cutting region combination searching unit 110 (S14). It should be noted that the detail of Step S14 will be described later using FIG. 16.

Next, the sequence of cutting operations is determined for the combination of cutting regions by the cutting sequence calculating unit 111. In the process, for example, the sequence is determined so as to satisfy the restriction that the cutting is started from a cutting region existing at a coordinate on the initial shape side among the cutting regions on the basis of the coordinate data of the cutting regions (S15).

Finally, data of the generated cutting operations is output by the output means 104 (S16).

Figure 8:
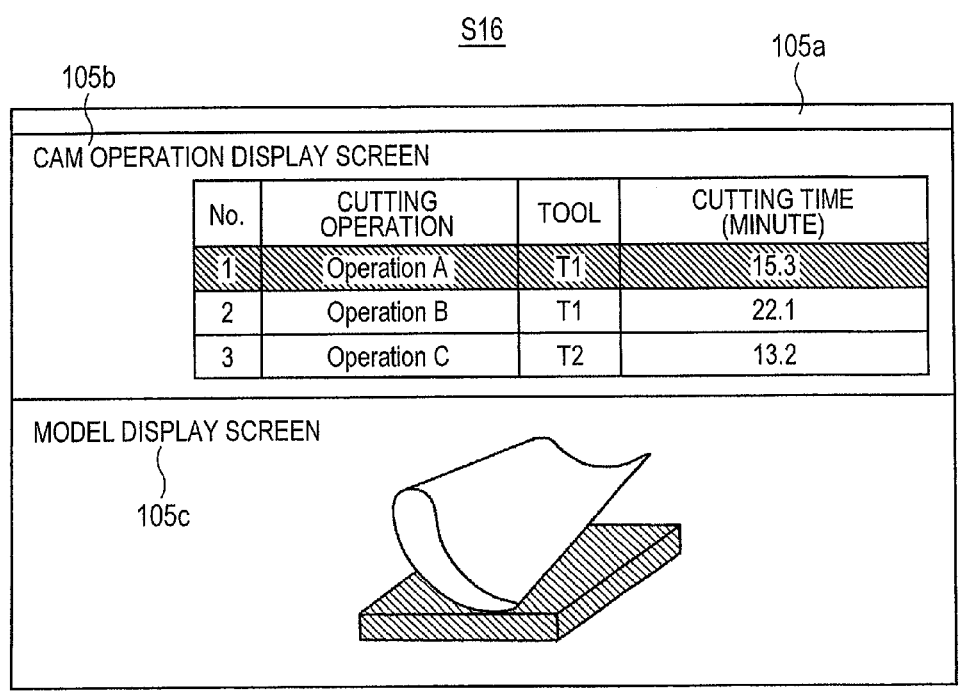
FIG. 8 is a diagram for showing a display screen.

FIG. 8 is an outline view for showing an example of a display screen output by the output means 104. As shown in the drawing, a CAM operation display screen 105a has a CAM operation display screen 105b and a model display screen 105c. The CAM operation display screen 105b displays results of the generated cutting operations. As shown in the drawing, the sequence of the generated cutting operations, operation names, tools, and cutting times are displayed. The model display screen 105c displays a finish shape model and a result of the generated cutting region. As shown in the drawing, the cutting region of the cutting operation selected on the CAM operation display screen is highlighted on the display screen 105c as shown in FIG. 8, so that the target cutting region of the current CAM operation can be easily recognized.

(Generation of Cutting Region Plan)

FIG. 9 is a flowchart for showing an embodiment of a process of generating a cutting region in Step S11 of FIG. 7.

First, the cutting region calculating unit 105 obtains data of a finish shape and an initial shape (S20). In this case, the data is face data and curve data that configure the CAD models of the finish shape and the initial shape. More specifically, for example, the face is configured in a B-Spline surface format, and the line is configured in a B-Spline curve format. The B-Spline surface and the B-Spline curve are configured using a collection of sequences of points called "control points" to configure the face and line.

Next, a finish shape included shape and a swept shape are generated from the initial shape (S21).

The process of Step S21 will be described using FIG. 10.

Figure 10A:
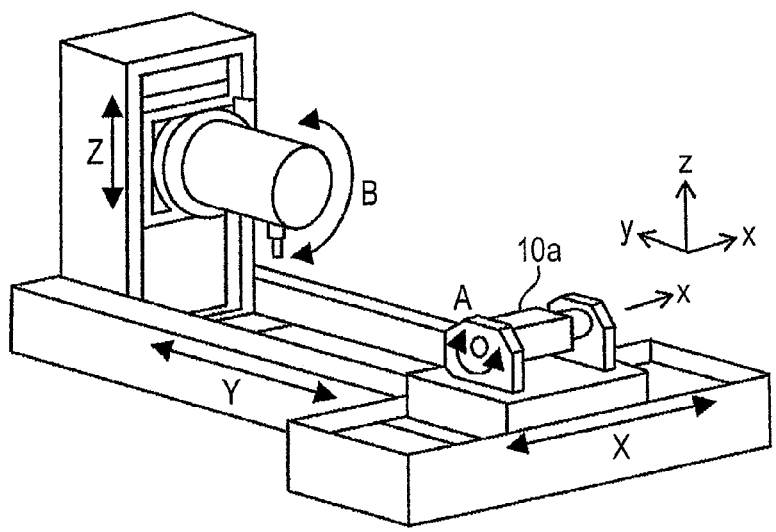
FIG. 10A is a perspective view of the cutting machine.

FIG. 10A shows an example of a cutting machine and a setting condition of an initial workpiece. The cutting machine shown in FIG. 10A is connected to the computer 600 of FIG. 6 through the communication device 605. The cutting machine of FIG. 10A is a simultaneously controlled 5 axes cutting machine having table moving 3 axes (X, Y, and Z) and rotation 2 axes (A and B), and the initial workpiece is set to be sandwiched in parallel with a rotary table A, so that the initial workpiece is rotated on the rotary table A in the X direction and the tool is rotated on a rotary table B in the Y direction.

The cutting machine having such a configuration is structured to sandwich the initial workpiece between chucks on the rotary table A, and thus the weight on the rotary table A is increased. Accordingly, the rotational speed of the rotary table A is, in general, slower than those of the other tables. Further, the rotary table A and the rotary table B are of rotational structures, and rotating objects are susceptible to mechanical effects from outside. As a result, the rigidity seemingly tends to be low. Therefore, in the case where the cutting load is increased as rough cutting, it is said that less rotation leads to an increase in rigidity.

Figure 10B:
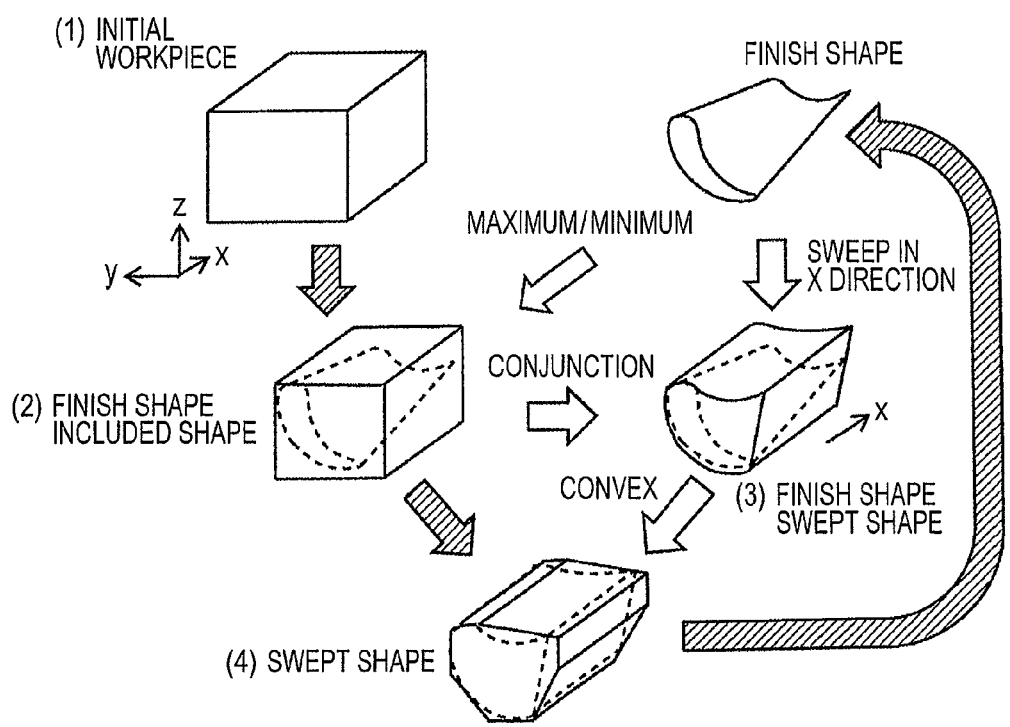
FIG. 10B is a diagram for showing a cutting region generation flow.

Accordingly, a cutting plan in which three axes X, Y, and Z are operated at the position where the initial workpiece is first set is set in the generation of the cutting plan of FIG. 10B.

The process of Step 21 will be described again.

In Step 21, the generation of the finish shape included shape will be described first.

As shown on the upper right side of the generation of the cutting plan of FIG. 10B, the maximum and minimum values in the X, Y, and Z axis directions are obtained with reference to each face data of the finish shape. Specifically, the sizes in the X, Y, and Z directions of a cuboid including the finish shape are obtained.

Next, a cuboid having vertices of the maximum and minimum values is set, and the cuboid is cut out of the initial workpiece (1) to form a finish shape included shape (2).

Next, the generation of a swept shape (4) will be described.

The shape is created in such a manner that the finish shape is swept (scanned) in the X direction and a conjunction is performed together with the finish shape included shape (2). The conjunction is a logical conjunction of two two-dimensional cross-sectional shapes (the finish shape included shape (2) and the finish shape). While positions for operations are swept in the X direction, a logical disjunction of results of logical operations obtained at continuous positions in the X direction is obtained, so that the swept shape (4) can be obtained. Specifically, the conjunction can be obtained as a drawing obtained by projecting the finish shape from the X direction onto the Y-Z plane. The sweeping in the X direction is performed because the position at which the initial workpiece is fixed is located on the X axis. For example, in the case where a rotary table is provided, it is conceivable that the sweep shape is created in the direction vertical to the rotary table. The shape created in such a manner is a finish shape swept shape shown in (3) of FIG. 10B.

Next, the swept shape (4) is created from the finish shape swept shape (3).

FIG. 11 is an explanatory view of a process in which the swept shape (4) is created.

Figure 11A:
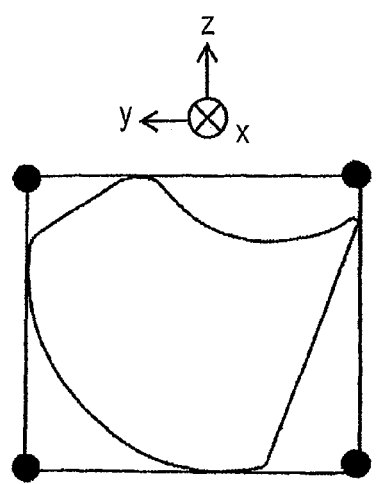
FIGS. 11A and 11B are diagrams each explaining a generation procedure of a pentahedron using a cross section of the Y-Z plane.

The finish shape swept shape (3) is a shape created by sweeping in the X direction, and thus all the cross-sections match each other on the Y-Z plane when viewed from the X axis direction (direction from the front side to the back side of the drawing) as shown in FIG. 11A. Therefore, the process will be described on the Y-Z plane.

Figure 11B:
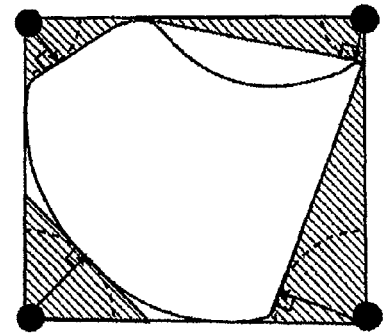

First, the vertices (black circles in FIGS. 11A and 11B) of the finish shape included shape on the Y-Z plane are extracted, and a position nearest to the finish shape, namely, a position having the shortest distance is created for each vertex. Among the functions of a commercially-available CAD or CAM, the process corresponds to a function in which a pedal point (an intersection point between a perpendicular drawn to a line from a point that is not located on the line and the line) is created from one point (one vertex) (point of the black circle) to the face, or a point having the shortest distance to the one point and the face is created as shown in FIG. 11B. Thus, using the function, the position that is nearest to the finish shape is determined for each vertex. Namely, a circle with the shortest radius is obtained among those about the point of the black circle whose arcs come into contact with the shape. If the Y-Z plane is cut with the tangent line passing through the tangent point of the circle, the swept shape (4) can be obtained. Namely, if the finish shape included shape (2) is chamfered as described above, the swept shape (4) can be obtained. Next, the finish shape included shape is cut off with a plane passing through the point and having the normal direction with respect to the cross-section at the point, and a solid on the finish shape side is created. If the process is performed for 4 vertices, the swept shape can be determined as shown in FIG. 11B.

Another method of creating the swept shape (4) will be described.

The swept shape is, in other words, a shape obtained by sweeping the drawing surrounded by segments on the Y-Z plane in accordance with the thickness of the finish shape included shape in the X direction.

Accordingly, the finish shape and the finish shape included shape are first projected on the Y-Z plane to create the drawing on the Y-Z plane shown in FIG. 11A, and the points having the shortest distances from the vertices of the outside quadrangle to the inner curves are obtained. Next, the tangent line passing through the point is created, and a line is determined using the point and the tangent line. Next, the quadrangle is cut off with the line to left the curve-side shape on which the finish shape swept shape is projected. If the process is repeated for 4 vertices, a convex drawing on the Y-Z plane can be obtained. If the drawing is swept in accordance with the thickness in the X direction, the swept shape can be created.

The above has been described using the functions of a commercially-available CAD or CAM. However, if a two-dimensional drawing is discretized to groups of points, the shortest point may be obtained using a Voronoi drawing (the Voronoi drawing is a drawing obtained in such a manner that in the case of three dimensions, among polyhedrons configured using perpendicular bisecting planes of groups of points adjacent to the point, a group of points sharing the faces of one polyhedron with the smallest volume and the point are connected using segments, and a Delaunay network is a drawing obtained in such a manner that groups of points sharing the faces are connected to each other). However, the swept shape is changed depending on the intervals of discretization in this case, and thus it is necessary to set appropriate intervals on the basis of the machining accuracy.

This is the end of the explanation for S21.

Next, referring back to FIG. 9, the process of S22 will be described with reference to steps 12a and 12b of FIG. 12.

In S22, the finish shape included shape is subtracted by boolean operation from the initial shape to create a subtract shape A. The step 12b represents the drawing of the subtract shape A. As shown in the step 12b, the hollow finish shape included shape is created inside the initial shape.

Next, referring back to FIG. 9, the process of S23 will be described with reference to steps 12c to 12o of FIG. 12.

In the process of S23, six hexahedrons are created to create the finish shape included shape by removing six faces from the initial shape. In the step 12c, a hexahedron with the smallest value in the Z direction is created first; a hexahedron (step 12e) with the smallest value in the Y direction is created; a hexahedron (step 12g) with the largest value in the Z direction is created; a hexahedron (step 12i) with the largest value in the Y direction is created; a hexahedron (step 12k) with the smallest value in the X direction is created; and a hexahedron (step 12m) with the largest value in the X direction is created. In addition, the subtraction by boolean operation is performed for each, so that the finish shape included shape (step 12n (12o)) is created.

Figure 12:
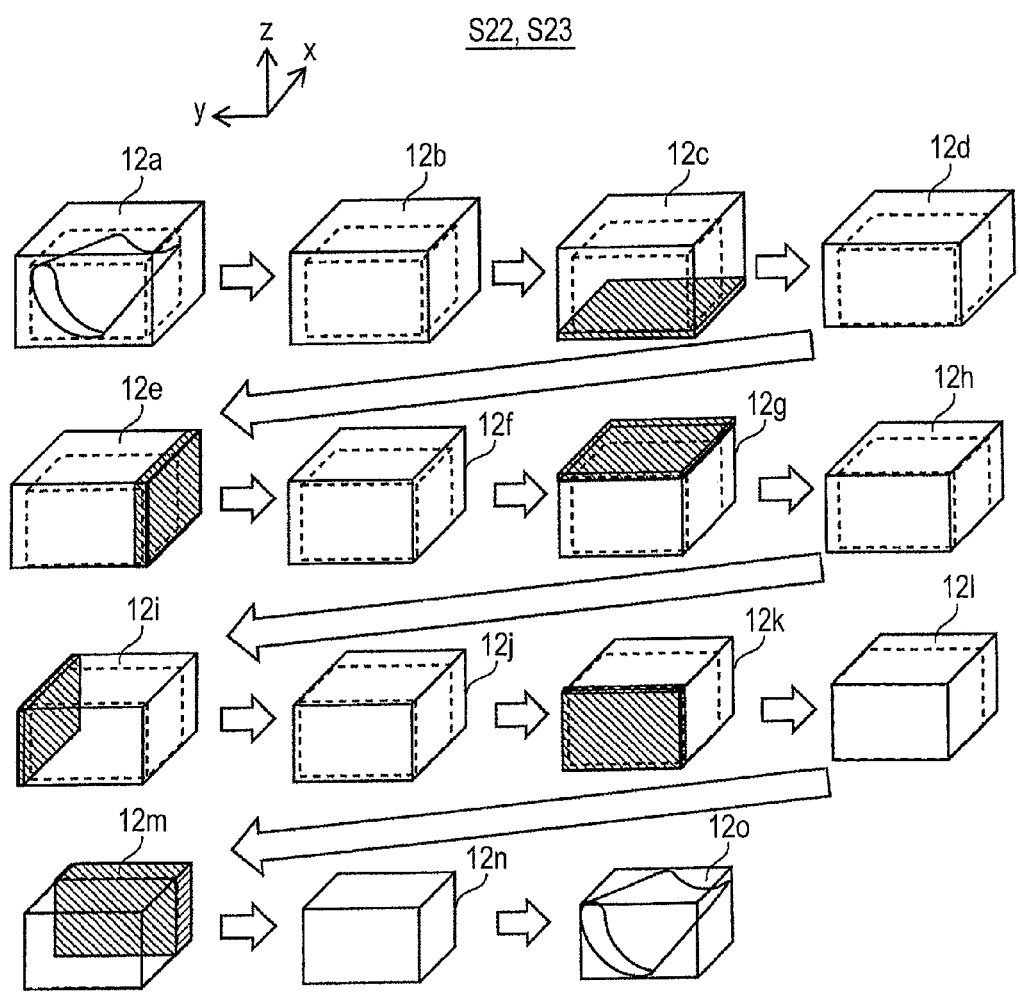
FIG. 12 is an explanatory view for explaining a flow of creation of hexahedron cutting regions.

FIG. 12 shows an example of cutting steps of the cutting regions of the hexahedrons. However, the cutting regions of the hexahedrons are changed depending on the largest value or the smallest value of each axis to be used first and depending on the sequence of creating the hexahedrons. Therefore, the combinations of cutting regions of the hexahedrons are created as many as possible.

There is a case in which the cutting regions of the hexahedrons cannot be cut depending on how the initial workpiece is fixed to the cutting machine. For example, in a cutting machine in which the initial workpiece is fixed on a table, it is impossible to cut the fixed face. Further, in a cutting machine in which the initial workpiece is fixed to a rotational axis, there is a case in which the cutting of the fixed two faces becomes impossible or restricted because the tool and the holder interfere with a mechanism to fix the initial workpiece. Such cutting regions are set so as not to be used in an interference check by the cutting simulation unit 208 shown in FIG. 1.

Next, referring back to FIG. 9, the process of S24 will be described with reference to steps 13a and 13b of FIG. 13.

In S24, the swept shape is subtracted by boolean operation from the finish shape included shape to create a subtract shape B. The step 13a represents the drawing of the subtract shape B. As shown in the step 13a, the hollow swept shape is created inside the finish shape included shape.

This is the end of the explanation for S24.

Next, referring back to FIG. 9, the process of S25 will be described using steps 13b to 13i of FIG. 13.

In the process of S25, pentahedrons (polyhedrons each configured using two triangle counter-face surfaces and three sides) are created to create the swept shape by removing four faces from the finish shape included shape. In Step 13b, a pentahedron is first created from the longest side in the Z direction and the shortest side in the Y direction; a pentahedron (step 13d) is created from the shortest side in the Z direction and the shortest side in the Y direction; a pentahedron (step 13f) is created from the shortest side in the Z direction and the largest side in the Y direction; and a pentahedron (step 13h) is created from the longest side in the Y direction and the longest side in the Z direction. In addition, the subtraction by boolean operation is performed for each, so that the swept shape is created.

It should be noted that each pentahedron itself is created by the methods shown in FIGS. 11A and 11B.

Figure 13:
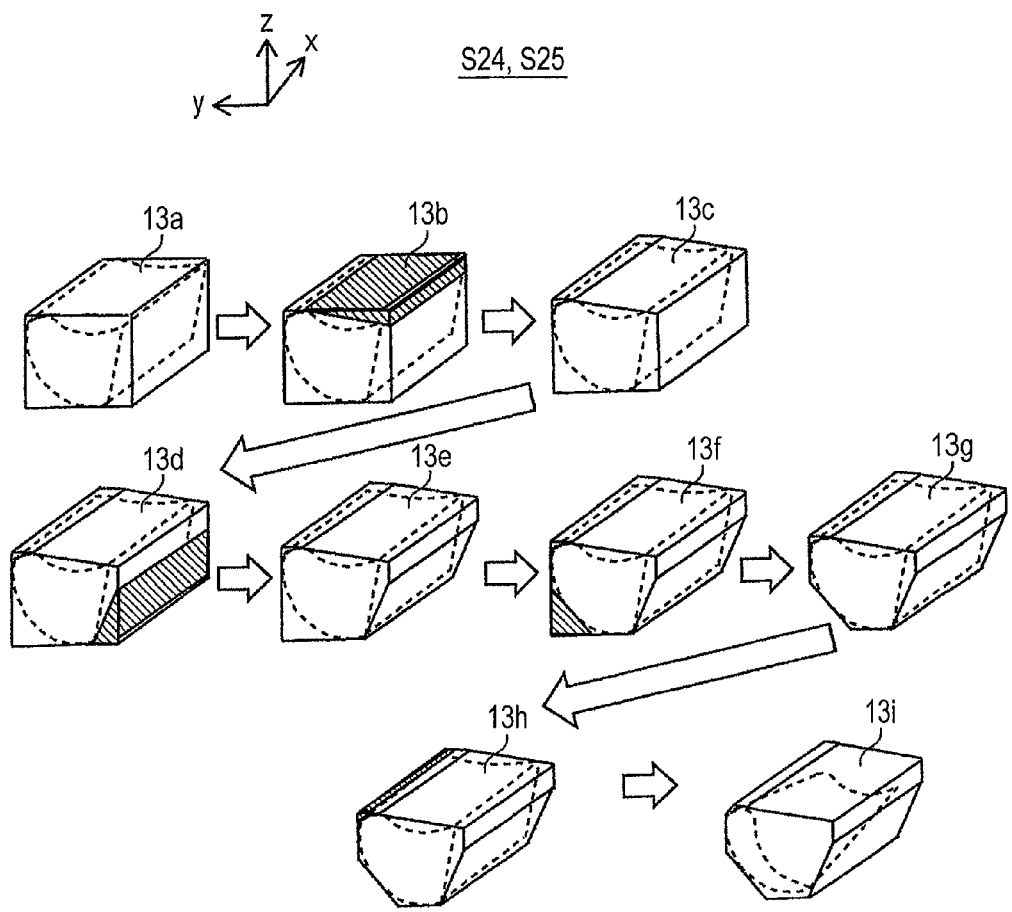
FIG. 13 is an explanatory view for explaining a flow of creation of pentahedron cutting regions.

FIG. 13 shows an example of cutting steps of the cutting regions of the pentahedrons. However, the cutting regions of the pentahedrons are not dependent on where to start first. This is because the final shape is a convex shape. Namely, the process corresponds to chamfering of a cuboid representing the finish shape included shape.

There is a case in which the cutting regions of the pentahedrons cannot be cut depending on how the initial workpiece is fixed to the cutting machine. For example, in a cutting machine in which the initial workpiece is fixed on a table for fixing the initial workpiece, it is impossible to cut the fixed face. Further, in a cutting machine in which the initial workpiece is fixed to a rotational axis, there is a case in which the cutting of the fixed two faces becomes impossible or restricted because the tool and the holder interfere with a mechanism to fix the initial workpiece. Such cutting regions are set so as not to be used in an interference check by the cutting simulation unit 208 shown in FIG. 1.

This is the end of the explanation for S25.

Next, referring back to FIG. 9, the process of S26 will be described using FIG. 14.

In the process of S26, finish shape cutting regions are created to form the finish shape from the swept shape.

In FIG. 14, the finish shape cutting regions of four faces representing the finish shape are created. The finish shape cutting regions include four faces, dihedrons, trihedrons, and tetrahedrons. Thus, combinations of cutting regions of the assumed number are prepared. Further, in the case where the cutting becomes impossible due to a fixing method of the initial workpiece, such cutting regions are set so as not to be used in an interference check by the cutting simulation unit 208 shown in FIG. 1. In the embodiment, the swept shape that is a polyhedron in accordance with (including) the finish shape and that has less cut regions by the cutting machine is preliminarily generated as shown in FIG. 14, and the swept shape is cut to generate the finish shape. Thus, the cutting time of the cutting machine can be shortened.

This is the end of the process of S26.

The processes from S20 to S26 are performed, so that the generation procedure (S11) of the cutting region plan shown in FIG. 7 is executed.

(Setting of Tool Axis)

Next, setting of the tool axis in S12 will be described.

FIG. 15 is a flowchart for showing a setting process of the tool axis angle in Step S12 of FIG. 7.

First, the tool axis angle calculating unit 106 shown in FIG. 1 extracts the cutting region in Step S40.

Next, it is determined in Step S41 whether the cutting region is a pentahedron or hexahedron. If the determination result shows that the cutting region is a pentahedron or hexahedron, Step S42 is performed. If the determination result shows that the cutting region is of another shape, Step S43 is performed.

In Step S42, the tool axis angle is set so as not to interfere with the finish shape and so as to be vertical to the maximum face in the cutting region.

In Step S43, the tool axis angle is set on the basis of the predetermined change step of the tool axis angle set by the input unit 103 shown in FIG. 1. For example, the tool axis angle is set by changing the tool axis angle every 10 degrees.

Next, a tool path (swept of the tool) is generated for the cutting region by the tool path generation unit 107 shown in FIG. 1 (S44). In Step S44, the tool path is generated on the basis of the tool axis angle. For example, the tool path is generated on the basis of a path pattern such as contouring of the path set by the input unit 103. It should be noted that the tool axis angle and the tool path can be obtained using data of each part of the finish shape, and data of the installation position and direction of the shape.

Next, a cutting simulation is performed by the cutting simulation unit 108 on the basis of the generated tool path (S45).

Next, it is determined in Step S46 whether or not the remainder satisfies a predetermined remainder standard set by the input unit 103, whether not to interfere with the finish shape, and whether or not the length of the tool path is shortest on the basis of the result of the cutting simulation performed in Step S45. If these are satisfied, Step S47 is performed. If not, the flow returns to Step S43.

Next, the selected tool axis angle is adopted and the axis angle in accordance with the change step is set in Step S47.

Next, it is determined in Step S48 whether or not the axis angle is set at each change step. If the all axis angles are set, S49 is performed. If not, S43 is performed.

Finally, it is determined in S49 whether or not there are other cutting regions. If there are other cutting regions, the flow is repeated from S40 in which the other cutting regions are extracted. If there are no other cutting regions, the process is completed.

The processes from S40 to S49 are performed, and the setting process of the tool axis in S12 shown in FIG. 7 is completed.

(Calculation of Cutting Time)

Next, calculation of cutting time in Step 13 will be described.

The cutting time is obtained by multiplying the tool path length by the tool feed rate. Specifically, it is necessary to consider the acceleration or deceleration time of the speed, the transferring time from the NC apparatus, and the response speed of the cutting machine. However, the present invention uses the time obtained by multiplying the tool path length by the tool feed rate. If it is necessary to finely reduce time, a process of setting a strict cutting time may be provided.

(Search for Combination of Cutting Regions)

Next, a search process of combinations of cutting regions shown in Step S14 will be described.

FIG. 16 is a flowchart for showing a search process of combinations of cutting regions shown in Step S14 of FIG. 7.

First, the cutting region combination searching unit 110 shown in FIG. 1 generates an initial plan of a combination of cutting regions (Step S50). In Step S50, the cutting regions are sequentially arranged in ascending order in terms of the cutting time, so that a cutting region plan in which the subtract shape is filled is created.

Next, for example, the cutting regions of the arbitrary number generated using random numbers are replaced with another cutting region plan while the number of regions of combinations of cutting regions among the created combinations is used as the upper limit (Step S51).

Next, if the total cutting time for the replaced cutting regions is shorter than that for the current combination plan, Step S53 is performed. If not, the flow returns to Step S51. In Step S53, the cutting region plan replaced in Step S51 is adopted.

Next, if there are no combinations in which the cutting time is decreased in the all replacements in Step S54, the processing flow is completed. If there are combinations in which the cutting time is decreased, the flow returns to Step S52. The processes from S50 to S54 are performed, so that the process of S14 shown in FIG. 7 is completed.

(Setting of Cutting Sequence)

Next, the cutting sequence is set on the basis of the combination of cutting regions created in S14 (S15).

Finally, the determination result of the cutting sequence is output in S16 to complete the process. FIG. 8 is a display example of the cutting sequence output as described above.

As described above, the cutting region calculating unit 105 shown in FIG. 1 is operated, so that the hexahedron cutting region, the pentahedron cutting region, and the finish shape cutting region can be created. Further, the tool axis angles can be set for the hexahedron cutting region, the pentahedron cutting region, and the finish shape cutting region by the tool axis angle calculating unit 106.

Further, the tool path generation unit 107 is operated, so that the tool path can be created for the hexahedron cutting region, the pentahedron cutting region, and the finish shape cutting region, and the tool path is simulated by the cutting simulation unit 108, so that the interference with the cutting machine and cutting of the finish shape can be discriminated. Thus, the hexahedron cutting region, the pentahedron cutting region, and the finish shape cutting region to be excluded can be identified.

Further, the cutting time calculating unit 109 calculates the cutting time using the tool path for the hexahedron cutting region, the pentahedron cutting region, and the finish shape cutting region and machining condition data, so that the cutting region searching unit 130 can extract a combination of cutting regions that can be cut in the minimum cutting time.

Further, the cutting sequence calculating unit 111 creates the cutting sequence from the combination of cutting regions extracted by the cutting region searching unit 110 to be displayed on the output means 104, so that an operator can easily confirm the final cutting region.

What is claimed is:

1. An computer aided manufacturing (CAM) apparatus to control a cutting machine to process an initial workpiece into a finish shape according to numerical control (NC) data which includes a plurality of cutting regions, the CAM apparatus comprising:
    a processor; and
    a memory which stores instructions that, when executed by the processor, cause the processor to perform a method of CAM to process the initial workpiece including:
        creating a rectangular shape including the finish shape from a shape of the initial workpiece and creating a swept shape by projecting the finish shape from a first direction;
        creating a subtract shape A obtained by subtracting the rectangular shape from a shape of the initial workpiece;
        dividing the subtract shape A into a plurality of hexahedron cutting regions;
        creating a subtract shape B obtained by subtracting the swept shape from the rectangular shape;
        dividing the subtract shape B into a plurality of pentahedron cutting regions that define a polyhedron from the rectangular shape;
        creating a plurality of finish shape cutting regions for forming the finish shape from the polyhedron;
        creating the cutting regions of the NC data from the hexahedron cutting regions, the pentahedron regions, and the finish shape cutting regions;
        obtaining a plurality of linear travelling distances and a plurality of rotational angles of one or more tools of the cutting machine on a basis of the cutting regions; and
        controlling the cutting machine on the basis of the linear travelling distances and rotational angles of the tools to process the initial workpiece into the finish shape.

2. The apparatus for a cutting process automatic generation tool of CAM according to claim 1, wherein the memory further stores instructions that, when executed by the processor, cause the processor to perform the method of CAM to process the initial workpiece which further includes:
    setting a plurality of tool axis angles for the hexahedron cutting regions and pentahedron cutting regions so that the tools do not interfere with a current cutting shape of the workpiece and the cutting machine and the tools are vertical to a largest face of the respective hexahedron regions and the respective pentahedron regions, and that sets a plurality of tool axis angles for the finish shape cutting regions to satisfy a remainder standard requested by a CAM operator and to make a tool path length shortest on a basis of the tools and machining conditions.

3. The apparatus for a cutting process automatic generation tool of CAM according to claim 1, wherein the memory further stores instructions that, when executed by the processor, cause the processor to perform the method of CAM to process the initial workpiece which further includes:
    allocating the tools and machining conditions for the hexahedron cutting regions, the pentahedron cutting regions, and the finish shape cutting regions to generate a tool path, and
    calculating a cutting time on a basis of the machining conditions of a length of the tool path and a tool feed rate.

4. The apparatus for a cutting process automatic generation tool of CAM according to claim 1, wherein the memory further stores instructions that, when executed by the processor, cause the processor to perform the method of CAM to process the initial workpiece which further includes:
    calculating a combination of the cutting regions with a shortest cutting time among a plurality of combinations of the hexahedron cutting regions, the pentahedron regions, and the finish shape cutting regions.

5. A method of computer aided manufacturing (CAM) by a cutting machine when the cutting machine processes an initial workpiece into a finish shape according to numerical control (NC) data which includes a plurality of cutting regions, the method comprising the steps of:
    creating a rectangular shape including the finish shape from a shape of the initial workpiece and creating a swept shape by projecting the finish shape from a first direction;
    creating a subtract shape A obtained by subtracting the rectangular shape from a shape of the initial workpiece;
    dividing the subtract shape A into a plurality of hexahedron cutting regions;
    creating a subtract shape B obtained by subtracting the swept shape from the rectangular shape;
    dividing the subtract shape B into a plurality of pentahedron cutting regions that define a polyhedron from the rectangular shape;
    creating a plurality of finish shape cutting regions for forming the finish shape from the polyhedron;
    creating the cutting regions of the NC data from the hexahedron cutting regions, the pentahedron regions, and the finish shape cutting regions;
    obtaining a plurality of linear travelling distances and a plurality of rotational angles of one or more tools of the cutting machine on a basis of the cutting regions; and
    controlling the cutting machine on the basis of the linear travelling distances and rotational angles of the tools to process the initial workpiece into the finish shape.

6. A non-transitory computer-readable storing medium that stores a program to execute a method of computer aided manufacturing (CAM) by a cutting machine when the cutting machine processes an initial workpiece into a finish shape according to numerical control (NC) data which includes a plurality of cutting regions, the method stored in the program comprising the steps of:
    creating a rectangular shape including the finish shape from a shape of the initial workpiece and creating a swept shape by projecting the finish shape from a first direction;
    creating a subtract shape A obtained by subtracting the rectangular shape from a shape of the initial workpiece;
    dividing the subtract shape A into a plurality of hexahedron cutting regions;
    creating a subtract shape B obtained by subtracting the swept shape from the rectangular shape;
    dividing the subtract shape B into a plurality of pentahedron cutting regions that define a polyhedron from the rectangular shape;
    creating a plurality of finish shape cutting regions for forming the finish shape from the polyhedron;

creating the cutting regions of the NC data from the hexahedron cutting regions, the pentahedron regions, and the finish shape cutting regions;

obtaining a plurality of linear travelling distances and a plurality of rotational angles of one or more tools of the cutting machine on a basis of the cutting regions; and controlling the cutting machine on the basis of the linear travelling distances and rotational angles of the tools to process the initial workpiece into the finish shape.

* * * * *